US012462821B2

(12) United States Patent
Mariager et al.

(10) Patent No.: US 12,462,821 B2
(45) Date of Patent: Nov. 4, 2025

(54) LOW LATENCY AUDIO PACKET LOSS CONCEALMENT

(71) Applicant: RTX A/S, Nørresundby (DK)

(72) Inventors: Peter Mariager, Nørresundby (DK); Jonas Koldkjaer Jensen, Nørresundby (DK); Filip Mathias Lillelund Jørgensen, Nørresundby (DK); Ricco Jensen, Nørresundby (DK)

(73) Assignee: RTX A/S, Norresundby (DK)

( * ) Notice: Subject to any disclaimer, the term of this patent is extended or adjusted under 35 U.S.C. 154(b) by 271 days.

(21) Appl. No.: 18/002,081

(22) PCT Filed: Jun. 17, 2021

(86) PCT No.: PCT/EP2021/066362
§ 371 (c)(1),
(2) Date: Dec. 16, 2022

(87) PCT Pub. No.: WO2021/255153
PCT Pub. Date: Dec. 23, 2021

(65) Prior Publication Data
US 2023/0230602 A1    Jul. 20, 2023

(30) Foreign Application Priority Data

Jun. 19, 2020  (DK) ................. PA 2020 70403

(51) Int. Cl.
*G10L 19/02*    (2013.01)
*G10L 19/005*   (2013.01)
*G10L 25/30*    (2013.01)

(52) U.S. Cl.
CPC ............ *G10L 19/02* (2013.01); *G10L 19/005* (2013.01); *G10L 25/30* (2013.01)

(58) Field of Classification Search
CPC ........ G10L 19/02; G10L 19/005; G10L 25/30
See application file for complete search history.

(56) References Cited

U.S. PATENT DOCUMENTS 10,424,305 B2*  9/2019  Biswas ................ G10L 19/005
2016/0148618 A1*  5/2016  Huang ................ G10L 19/0212
                                                            381/2

(Continued)

FOREIGN PATENT DOCUMENTS

CN      111292768 A      6/2020
WO   WO 2019/081070 A1   5/2019

OTHER PUBLICATIONS

Deep Learning—An MIT Press book; https://www.deeplearningbook.org/; accessed Feb. 10, 2023; 2 pages.

(Continued)

*Primary Examiner* — Douglas Godbold
(74) *Attorney, Agent, or Firm* — BakerHostetler

(57) ABSTRACT

The invention provides a method for real-time concealing errors in audio data packets. A Long Short-Term Memory (LSTM) neural network with a plurality of nodes is provided and pre-trained with audio data. A sequence of packets is received, each packet comprising a set of modified discrete cosine transform (MDCT) coefficients associated with a frame comprising time-domain samples of the audio signal. These MDCT coefficient data are applied to the LSTM neural network, and in case it is identified that a received packet is an erroneous packet, an output from the LSTM neural network is used to generate estimated MDCT coefficients to provide a concealment packet to replace the erroneous packet. Preferably, the MDCT coefficients are normalized prior to applying to the LSTM neural network. This method can be performed in real-time. A low latency can be obtained and still with a high audio quality.

22 Claims, 4 Drawing Sheets

(56) References Cited

U.S. PATENT DOCUMENTS

| | | | | |
|---|---|---|---|---|
| 2019/0051310 | A1* | 2/2019 | Chang | G10L 25/30 |
| 2020/0243102 | A1* | 7/2020 | Schmidt | G10L 19/005 |
| 2021/0125622 | A1* | 4/2021 | Zhao | G10L 25/21 |
| 2022/0180881 | A1* | 6/2022 | Xiao | G06N 3/045 |
| 2022/0189491 | A1* | 6/2022 | Liang | H04L 1/0002 |

OTHER PUBLICATIONS

Greff et al.; "LSTM: A Search Space Odyssey"; IEEE Transactions on Neural Networks and Learning Systems; vol. 28 No. 10; Oct. 2017; 12 pages.

International Patent Application No. PCT/EP2021/066362; Int'l Search Report and the Written Opinion; dated Oct. 5, 2021; 17 pages.

Lee et al.; "Packet Loss Concealment Based on Deep Neural Networks for Digital Speech Transmission"; IEEE/ACM Transactions on Audio, Speech, and Language Processing; vol. 24; Feb. 2016; p. 378-387.

Vladimir et al.; "A Wavelet Based Noise Reduction Algorithm for Speech Signal Corrupted by Coloured Noise"; Interspeech; Sep. 2005; p. 2073-2076.

Lecomte et al.; "Packet-loss concealment technology advances in EVS"; IEEE Int'l Conf. on Acoustics, Speech and Signal Processing; 2015; p. 5708-5712.

Lotfidereshgi et al.; "Speech Prediction Using an Adaptive Recurrent Neural Network with Application to Packet Loss Concealment"; IEEE Int'l Conf. on Acoustics, Speech and Signal Processing; 2018; p. 5394-5398.

Mohamed et al.; "ConcealNet: An End-to-end Neural Network for Packet Loss Concealment in Deep Speech Emotion Recognition"; Interspeech—Audio and Speech Processing; arXiv:2005.07777; May 2020; 5 pages.

Barrera et al.; "Improving Audio Quality in Duo with WaveNetEQ"; Google AI Blog; Apr. 1, 2020; https://ai.googleblog.com/2020/04/improving-audio-quality-in-duo-with.html; 5 pages.

\* cited by examiner

LOW LATENCY AUDIO PACKET LOSS CONCEALMENT

CROSS-REFERENCE TO RELATED APPLICATIONS

This application is the National Stage of International Patent Application No. PCT/EP2021/066362, filed Jun. 17, 2021, which claims the benefit of Danish Patent Application Number PA 2020 70403, filed Jun. 19, 2020. The disclosures of the foregoing applications are incorporated herein by reference in their entireties for any and all purposes.

FIELD OF THE INVENTION

The present invention relates to packet loss concealment of audio, such as by transmission of digital audio packets over a transmission channel introducing transmission errors causing damaging of packets or packet losses. More specifically, the invention provides a method and device for audio packet loss concealment with low latency.

BACKGROUND OF THE INVENTION

For e.g. wireless RF transmission of audio in packets, a concealment method is required at the receiver side of the transmission to handle the situation that an audio packet is lost or damaged in the transmission. However, often such concealment methods fail to generate a concealment packet which is a good estimate of the lost part of the audio signal, thus providing clearly audible artefacts.

Especially, for some applications high audio quality of such as speech and music is required, and even with a low latency. For wireless stage microphones or wireless music instrument transmitters, a very low latency of such as a maximum of 2-3 ms is required. Still, there is a demand for a high audio quality without any audible artefacts in case of audio packet losses, e.g. a loss of such as 1-5% may be considered normal.

Simple concealment algorithms exist that can be easily implemented, but they typically result in a poor audio quality, whereas a complex concealment algorithm providing a high audio quality can itself introduce a significant latency, and it may be even impossible in terms of computation power.

SUMMARY OF THE INVENTION

Thus, according to the above description, it is an object of the present invention to provide a method and device capable of high quality audio concealment with a low latency, most preferably the method should be capable of being performed by mobile devices with a limited computational capacity.

In a first aspect, the invention provides a method for concealing errors in packets of data representing an audio signal, the method comprising:
  providing a Long Short-Term Memory (LSTM) neural network with a plurality of nodes, wherein the LSTM neural network has been pre-trained with audio data,
  receiving a sequence of packets each comprising a set of modified discrete cosine transform (MDCT) coefficients associated with a frame comprising time-domain samples of the audio signal,
  applying the sequence of packets to the LSTM neural network,
  identifying in the received sequence of packets a packet to be an erroneous packet, i.e. a damaged or missing packet,
  generating estimated MDCT coefficients to replace the set of MDCT coefficients of the erroneous packet in response to an output from the LSTM neural network,
  generating a concealment packet based on the estimated MDCT coefficients, and
  replacing the erroneous packet with the concealment packet.

Such method is advantageous, since it has been found that concealment in the MDCT domain provides a high quality concealment when used for pre-training an LSTM neural network. This has been proven in tests with music sequences. Further, only a limited processing capacity is required at the receiver side, since it has been found that one single layer of such as 50-200 LSTM nodes is sufficient for obtaining a high audio quality, e.g. with packet error rates of such as 1-5%. Even further, a latency of down to 1-3 ms can be obtained. Thus, the method is even suitable for ultra high quality wireless audio for live performances where an ultra low latency is required. Still further, since it has been found that only an LSTM neural network with a rather limited complexity can be used, the concealment method can be performed in real-time on devices with limited processing power, e.g. mobile devices, even using high audio sample frequencies to support high audio quality. Thus, the method is suited for lossy transformation, e.g. an RF wireless connection.

Most preferably, the MDCT coefficients are normalized before being applied to the LSTM neural network. This has been found to ensure an efficient training and functioning of the LSTM neural network despite an audio material with a high dynamic range. To further enhance audio quality, it has been found that post-processing in the form of e.g. a soft-threshold function can be applied to the output of the LSTM neural network before generating the concealment packet.

Still further, the performance of the concealment may be improved, when the pre-training is performed with the specific type of audio for which the concealment method is to be used, e.g. a specific person's voice or a musical instrument. Specifically it has been found in listening tests, that pre-training with e.g. the same music genre which the method is to be used for will increase performance.

Especially, it may be possible to improve the performance by online training of the LSTM neural network after is has been pre-trained, thus further adapting the LSTM neural network to the actual audio content.

The MDCT transform can be performed either on the transmitter side or at the receiver side. Thus, the method can be applied on the receiver side only, where the received audio packets are first transformed from any audio format into the MDCT domain before applied to the LSTM neural network.

By LSTM neural network is understood as a recurrent neural network architecture with one or more layers of LSTM nodes which involve feedback connections. An LSTM node typically comprises a cell, an input gate, an output gate and a forget gate. The cell remembers values over arbitrary time intervals and the three gates regulate the flow of information into and out of the cell. Such LSTM neural network can be provided on a processor or computer as known by the skilled person. Two examples of description of LSTM neural networks can be found in http://www.deeplearningbook.org/ or "LSTM: A search space odyssey", IEEE Transactions on Neural Networks and Learning Systems, 28(10):2222-2232, October 2017.

By MDCT transform and representation of an audio data packet by MDCT coefficient is known by the skilled person, e.g. MDCT is known within audio compression. The MDCT transform is a lapped transform based on the discrete cosine transform, i.e. consecutive blocks or packets of data overlap, e.g. by 20-70%, preferably 50%.

In the following, preferred embodiments and features will be described.

Preferably, the method comprises performing a normalizing procedure, such as performing a 2-norm normalization, on the MDCT coefficients of each packet to arrive at a normalized set of MDCT coefficient for each packet, before applying the normalized set of MDCT coefficients to the LSTM neural network. This has been found to improve audio quality and performance of the concealment, since it is ensured that the LSTM neural network is trained not only by temporal passages of the audio content with a high amplitude. Such normalization improves the ability of the LSTM neural network to learn to conceal low amplitude sequences of an audio signal. This can especially be used in combination of a Mean Square Error (MSE) loss function in the pre-training. Especially, the LSTM neural network is preferably pre-trained with audio data in the form of normalized sets of MDCT coefficients.

In cases, where the normalized MDCT packet is transmitted over a lossy channel, and one packet is lost or damaged, the scale factor associated with the normalization will also be lost, and thus this scale factor may need to be estimated by the LSTM neural network or by means of another prediction method.

The method may comprise applying a post-processing of the estimated MDCT coefficients to modify the estimated MDCT coefficients prior to generating the concealment packet. Especially, the post-processing comprises applying a soft-threshold function to modify the estimated MDCT coefficient output from the LSTM neural network prior to generating the concealment packet. Especially a soft-threshold function as known by the skilled person, has been found to reduce audible artefacts in concealment packets especially at high audio frequencies. Specifically, a soft-threshold function with a threshold value selected within 0.005-0.1, such as 0.005-0.05, may be used.

The sequence of packets are preferably overlapping packets each representing samples of audio, e.g. the sequence of packets are overlapping by 20-70%, such as by 40-60%, e.g. 50%.

Preferably, each packet represents 10-200 MDCT coefficients, such as 24-96 MDCT coefficients, preferably 48 or more. Test have shown that at least 48 coefficients is sufficient to provide a high audio quality.

Preferably, the LSTM neural network comprises at least 50 LSTM nodes, e.g. 50-500 LSTM nodes, such as 50-200 LSTM nodes. Preferably, at least 50 LSTM nodes are provided, more preferably at least 100 LSTM, which has proven in tests to be sufficient to provide a learning capability to provide high quality concealment. Specifically, an efficient embodiment is obtained by combining with a packet configuration where each packet represents 30-150 MDCT coefficients.

The LSTM neural network may comprise one or a plurality of LSTM layers, wherein each LSTM layer comprises a plurality of LSTM nodes in parallel. Specifically, it has been found that one single LSTM layer of nodes, such as with 50-200 LSTM node, is sufficient for a good learning and high concealment quality. Especially, outputs from nodes of the single LSTM layer are combined to provide the output of the LSTM neural network with a desired number of elements. Thus, the number of LSTM neural network output nodes does not necessarily need to match the desired number of concealment MDCT coefficients. A fully connected (FC) layer is most preferably used to get from the LSTM network to the desired MDCT output, thereby allowing a more free choice of number of LSTM nodes independent on the selected number of MDCT coefficients per packet.

Preferably, the method comprises training (pre-training) the LSTM neural network by a predetermined loss function using an audio input, especially a specific audio input, i.e. an audio input material is selected for pre-training which has at least to some extent similar audio features as the audio content on which the method is concealment. Especially, the specific audio input used for pre-training may be selected from: a specific voice such as male or female voice or a voice of a specific person, a specific music instrument, or a specific music genre, or a specific person playing a specific instrument. Further, the LSTM neural network may be trained om a broader and more general set of a variety of audio data, which may be used to provide a more general LSTM neural network that can provide an acceptable concealment quality but covering a broad variety of different audio signals.

In some embodiments, the method comprises training a plurality of different LSTM neural network configurations or LSTM neural network data sets using respective different specific audio inputs. In this way, it is possible to obtain an optimal training to a variety of different audio inputs, thereby allowing a rather simple LSTM neural network to be used rather than providing a complex network for covering a variety of very different audio contents. Especially, the method may comprise classifying audio in response to received packets, and selecting one of the different pre-trained LSTM neural network configurations or LSTM neural network data sets to be used for generating estimated MDCT coefficients accordingly. Such audio classifying algorithms are known by the skilled person, and thus the concealment method can adapt its properties to the actual audio content, since it is possible to select the best matching pre-trained LSTM neural network for the actual audio content, thus obtained optimal audio concealment quality. Specifically, the classifying may involve applying an acoustic scene classification algorithm on the sequence of packets to classify received audio with respect to input type— loading of pre-trained set of data for LSTM neural network.

Especially, the packets represent audio that are to be decoded in an MDCT based audio decoder arranged to decode a sequence of packets into a sequence of decoded frames.

The method may comprise the step of transforming a sequence of audio samples into packets of MDCT coefficients prior to applying the sequence of packets to the LSTM neural network. Thus, a receiver device may receive audio packets in another format than MDCT and transform the packets into MDCT packets. Thus, in this way, the concealment method can be implemented entirely on the receiver side. Thus, especially transformation of audio samples into MDCT packets is performed after receiving packets via a wireless transmission channel, such as an RF wireless channel. If preferred, transformation of audio samples into MDCT packets may be performed prior to transmitting packets over a wireless transmission channel, such as an RF wireless channel. An advantage of this may be that a compression effect is obtained due to the inherent energy compacting property of the MDCT.

In some embodiments, the method comprises online performing the step of training the LSTM neural network in response to received packets. In this way, the pre-trained LSTM neural network can be even more specifically adaptive to the actual audio content, and can thus improve performance, since it is trained to the actual specific audio content being streamed. Especially, packets identified as erroneous packets are preferably excluded from said online training of the LSTM neural network.

The method may be used for one-way audio streaming as well as for duplex communication.

Especially, the packets may represent a digital audio signal sampled at a sample frequency of at least 8 kHz, preferably 16 kHz or more. The digital audio signal may be an encoded digital audio signal, such as encoded according to an ADPCM algorithm or the like. The digital audio signal may also be in a non-encoded form, e.g. a linear PCM signal, or other known audio formats.

Preferably, the method is performed in real-time, to allow online packet loss concealment of an audio input.

In a second aspect, the invention provides a computer program product comprising, such as a non-transitory computer-readable medium, with instructions for performing the method of the first aspect, when executed on a processor system.

In a third aspect, the invention provides a device comprising
- a wireless receiver configured to receive a wireless signal representing a sequence of packets representing an audio signal, and
- a packet loss concealment system arranged to receive the sequence of packets, and to perform the method according to the first aspect on a processor to arrive at a modified sequence of packets comprising at least one concealment packet.

In some embodiments, the device comprises an audio decoder arranged to receive the modified sequence of packet and to apply an MDCT based audio decoding algorithm so as to decode the modified sequence of packets into a sequence of decoded frames of audio.

Specifically, the wireless receiver unit is configured to receive a wireless RF signal, such as one of: Bluetooth, digital UHF, Digital Enhanced Cordless Telecommunication protocol (DECT), 4G, or 5G.

The device may especially be one of: a live performance base station, a wireless microphone, a wireless headset, a wireless intercom device, a video system, a teleconference system, a wireless audio monitor and a virtual reality device.

The device may be arranged to generate an output audio signal in response to the received sequence of packets, such as an electric analog signal or a digital signal or an acoustic signal.

The device is preferably configured for handling packets representing samples of the time signal, e.g. an audio signal or a vibration signal, at a sample frequency of at least 8 kHz, such as a sample frequency of 8-192 kHz, or such as a sample frequency of more than 192 kHz.

In a fourth aspect, the invention provides a system comprising
- an audio device comprising a wireless transmitter, wherein the audio device is arranged to generate a sequence of packets representing an audio signal and to transmit a wireless signal by means of the wireless transmitter representing the sequence of packets, and
- a device according to the third aspect, configured to receive the sequence of packets from the audio device.

Especially, the wireless transmitter may comprise an RF transmitter comprising an antenna, so as to allow transmission of a wireless RF signal at a carrier frequency according to a protocol.

In a fifth aspect, the invention provides use of the method according to the first aspect for one-way or two-way streaming of audio, such as one-way streaming of music or speech, or two-way speech communication.

In a sixth aspect, the invention provides use of the device according to the third aspect or the system according to the fourth aspect for one-way or two-way streaming of audio, such as one-way streaming of music or speech, or two-way speech communication.

It is appreciated that the same advantages and embodiments described for the first aspect apply as well the further mentioned aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
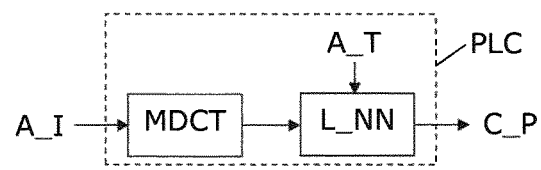
FIG. 1 illustrates a simple block diagram of an embodiment of the invention with audio packet loss concealment based on a pre-trained LSTM neural network operating in the MDCT domain.

FIG. 1 illustrates a simple block diagram of an embodiment with a packet loss concealment unit PLC. An input audio signal A_I is transformed into packets in the MDCT domain and applied to an LSTM neural network L_NN which has been pre-trained with a training audio input A_T, also in the MDCT domain. The LSTM neural network L_NN generates a concealment C_P packet based on the audio input A_I and its pre-training properties. It has been found that such concealment packet C_P provides a good estimate in case a packet of audio data is lost or is found to be erroneous, and thus results in a minimum of audible artefacts. The lost or erroneous packet is simply replaced by the concealment packet C_P.

Preferably, the MDCT packets are normalized prior to being applied to the LSTM neural network L_NN, such as using a 2-norm normalization. This has been found to help to improve learning efficiency and thus results in improved audio quality.

Further, the immediate estimated concealment output from the LSTM neural network L_NN is preferably applied to a post processing function, which in turn outputs the concealment packet C_P. Especially, it has been found that a soft-threshold function applied to the output from the LSTM neural network can improve audio quality. See FIG. 5 for an illustration of an example of such soft-threshold function to be used in the post-processing.

The packet loss concealment is useful due to the combination of a high audio quality, a low latency, and still with a limited complexity to allow implementation on device with low processing power capability, e.g. mobile devices.

Figure 2A:
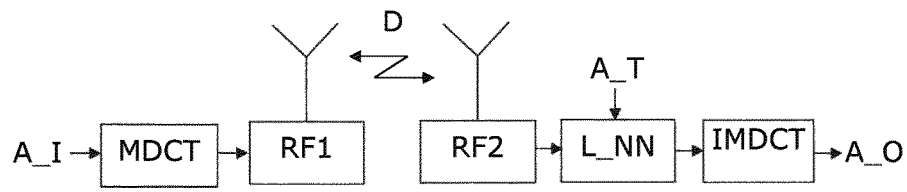
FIGS. 2*a* and 2*b* illustrate two basically different implementations with respect to MDCT transformation before and after wireless communication, the concept of packet loss concealment based on an LSTM neural network.
Figure 2B:
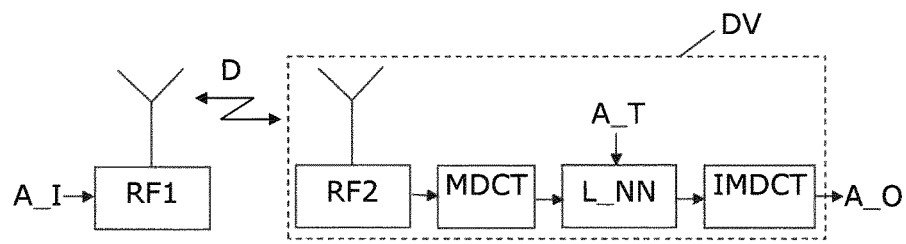

FIGS. 2a and 2b illustrate two basically different implementations with respect to MDCT transformation before and after wireless transmission. In both cases, audio data packets D are transmitted represented in an RF signal, e.g. according to a DECT protocol or other known RF protocol, from a device comprising an RF transmitter RF1 to a device comprising an RF receiver RF2.

Apart from the pre-training, the LSTM neural network L_NN may further be configured for being online trained by the MDCT transformed audio input A_I, thus allowing the network L_NN to adapt to the actual audio input A_I in order to provide the best possible concealment estimate.

In FIG. 2a, an audio input signal A_I is transformed into the MDCT domain prior to being transmitted by transmitter RF1 as a wireless RF representation MDCT data packet D, i.e. at the transmitter side. At the receiver side, the MDCT data packets are received by receiver RF2 and applied to the LSTM neural network L_NN which generates concealment packets, in case packets are lost or damaged in the RF transmission. An audio output A_O including such possible concealment packets is then generated after inverse MDCT IMDCT to arrive at a digital or analog audio output signal A_O.

In FIG. 2b, the transmitter RF1 transmits data packets D representing the audio input A_I in a non-MDCT format. After receipt by the receiver RF2 in the receiver device DV, a MDCT transform is applied to arrive at the MDCT representation which is then applied to the LSTM neural network L_NN which performed concealment as explained above to arrive at the final audio output A_O after inverse MDCT IMDCT.

It is to be understood that the concept can be used for one-way audio streaming, e.g. in a wireless stage microphone or wireless musical instrument transmitter. The concept can also be used for two-way intercom or teleconference system.

To be used for speech, the concealment performance can be in case the LSTM neural network has been trained with the sound of a specific person's voice, e.g. a singer or speaker, in case of a digital stage microphone. Alternatively, for a teleconference system, it is possible to store a set of LSTM neural network pre-train configurations for a number of specific person's voices. If the speaking person is identified during a teleconference call, the active LSTM neural network configuration matching the speaker person can then be selected for optimal concealment performance.

Figure 3:
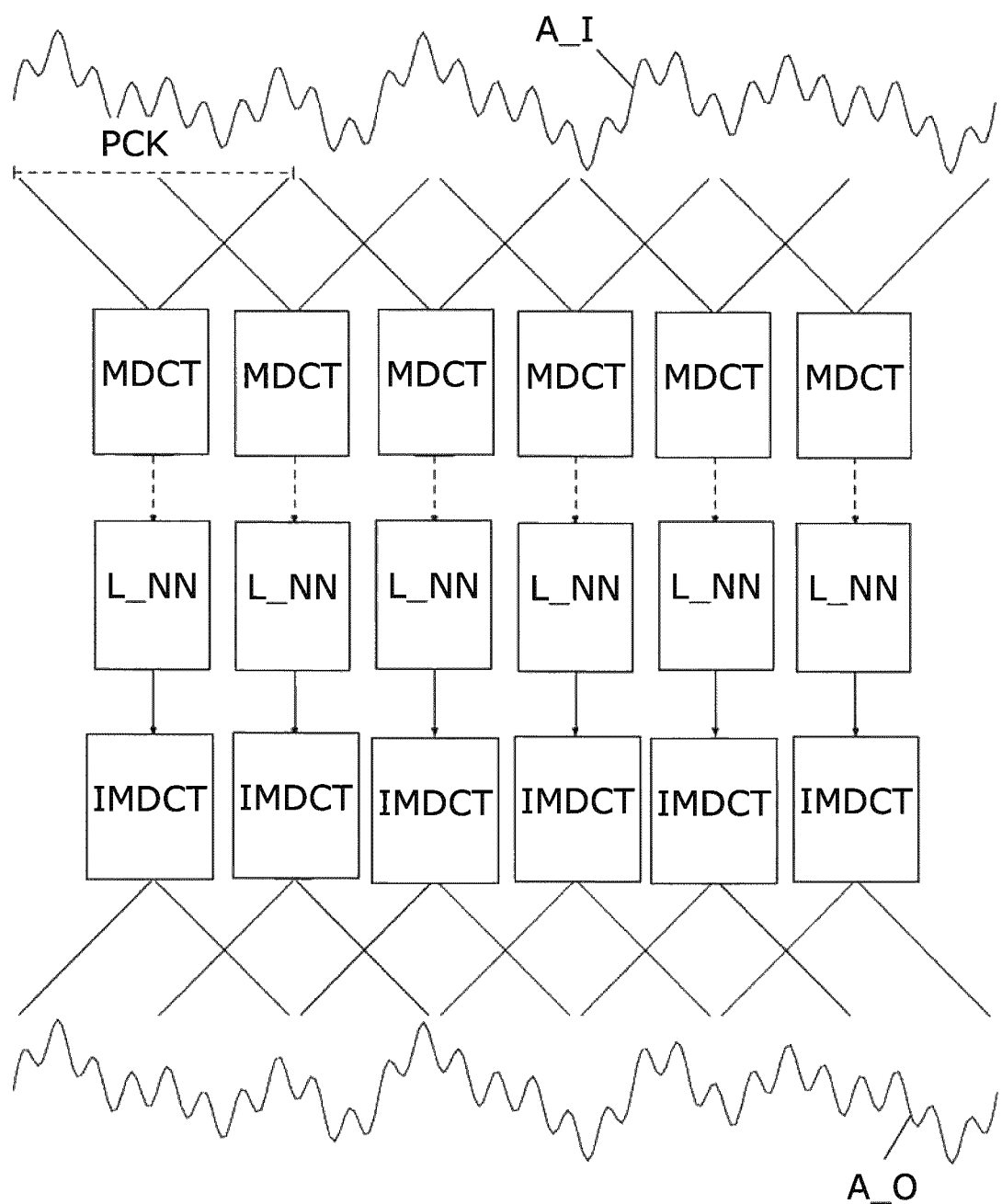
FIG. 3 illustrates the concept of MDCT transformation of an audio input, the LSTM neural network to operate as packet concealment generator, and inverse MDCT transformation to arrive at an audio output.

FIG. 3 illustrates one possibility for transforming an audio input signal A_I into overlapping packets PCK which are transformed into MDCT domain representation, e.g. each with 50-200 MDCT coefficients. After transmission over a transmission channel with packet loss or packet damage, the MDCT data are applied to a LSTM neural network L_NN which generates a concealment packet output being inverse MDCT transformed IMDCT into concealment audio packets that can be used to form a resulting output signal A_O similar to the audio input signal A_I.

Figure 4:
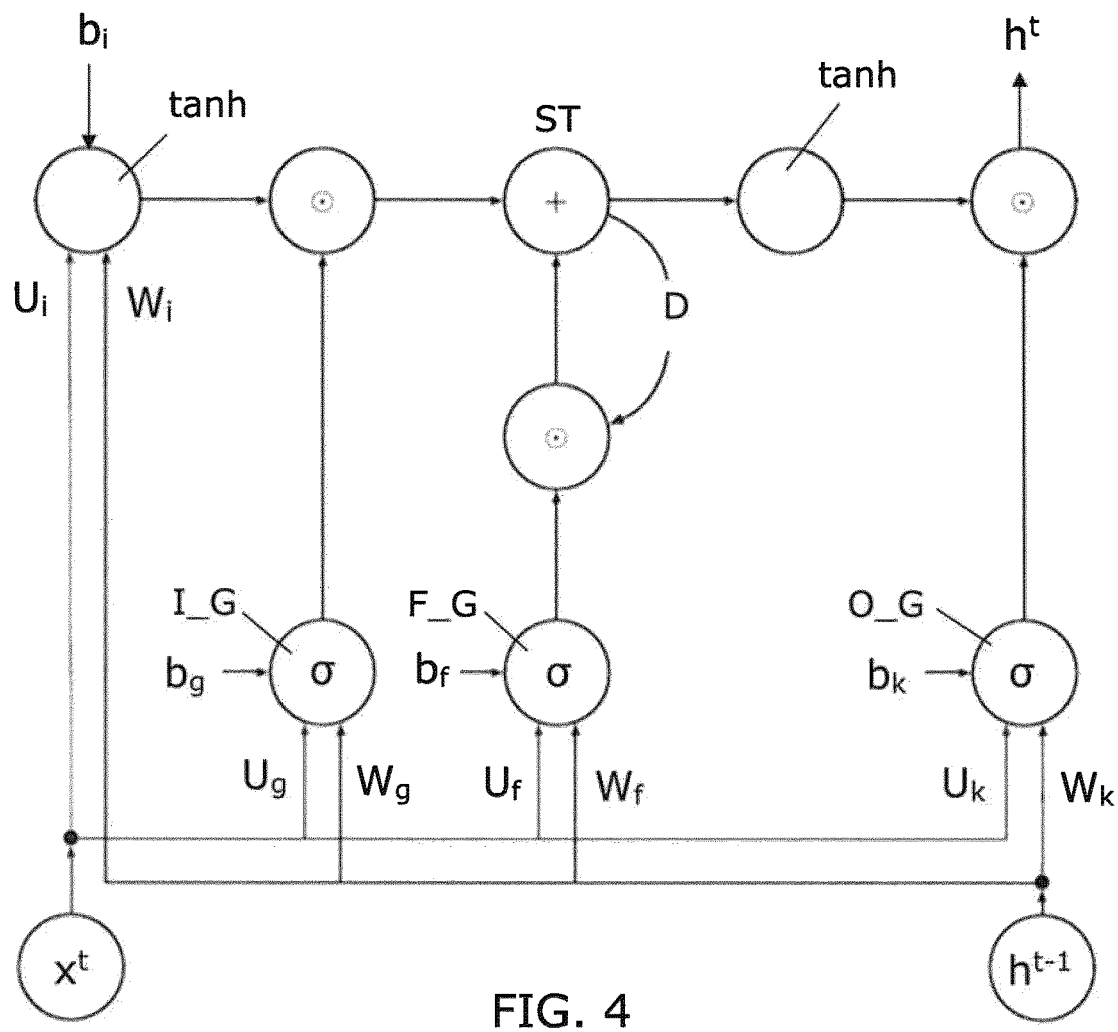
FIG. 4 illustrates nodes of an LSTM neural network.

FIG. 4 illustrates nodes of a possible implementation of an LSTM neural network layer. The input is $x^t$, whereas the output is $h^t$. Input gate I_G, forget gate F_G and output gate O_G all include a sigmoid activation function a which squashes the output to a value between 0 and 1. Further, tanh is a hyperbolic tangent activation function. The subscripts denote: input i, input gate g, forget gate f, and output gate k. Input weights associated with each subscript is denoted U, whereas recurrence weights associated with each subscript is denoted W. Bias associated with each subscript is denoted b.

The three gates I_G, F_G, O_G control an internal state which is used to learn long term dependencies. An LSTM layer includes several LSTM nodes in parallel each producing an output. Therefore, the Hadamard product is used (indicated in FIG. 4 by a dot in a circle). The trainable parameters are the biases b and weight matrices U, W. The dimensions of these trainable parameter are: N for parameter b, N×M for parameter U, and N×N for parameter W, where N is the number of nodes in the LSTM layer, and M is the input size.

The update equations for a single pass in the LSTM layer are:

$i^t = \tanh(U_i x^t + W_i h^{t-1} + b_i)$ $g^t = \sigma(U_g x^t + W_g h^{t-1} + b_g)$ $f^t = \sigma(U_f x^t + W_f h^{t-1} + b_f)$ $s^t = i^t \odot g^t + s^{t-1} \odot f^t$ $k^t = \sigma(U_k x^t + W_k h^{t-1} + b_k)$ $h^t = \tanh(s^t) \odot k^t$ The network is preferably trained using the back propagation through time algorithm, and here a loss function is used as a measure to optimize the network. A loss function that scores the performance of the network is based on the output of the network and the expected output, e.g. a mean squared error (MSE) may be used as a loss function.

Test have shown that LSTM neural network is most preferably pre-trained with the same specific type of audio which is expected as audio input when concealment is to be performed. In case of music, e.g. music segmented representing the expected music genre can be selected for pre-training. In case of specific musical instruments, sound from such musical instrument can be used for pre-training, and in case of speech, e.g. the specific person's voice may be used for optimal performance, otherwise a distinction between female and male voice for pre-training. Especially, sets of pre-trained parameters b, U, W may be stored for a set of different audio classes. According to an audio classification algorithm applied to the audio input, the audio input can be classified, and the pre-trained parameter b, U, W corresponding to the best matching audio class can be applied to the LSTM neural network for optimal concealment performance.

Tests have shown that rather short segments of audio is sufficient for training the LSTM neural network. However, longer segments of audio may improve performance without increasing complexity. Still, possible training instability may occur using long segments, and to avoid this, any sign of training instability should preferably be monitored during training.

Listening tests have been performed to confirm that a good concealment performance can be obtained with an LSTM neural network having one single layer only and with 200 LSTM nodes. However, with one single layer, an acceptable performance may be obtained by 50-200 LSTM nodes, e.g. around 80-120 LSTM nodes, only. This may be found to be a good compromise between learning capacity and computational complexity.

Specifically, audible tests have been performed with an LSTM neural network with one single layer and 100 LSTM nodes, and with overlapping packets of 48 audio samples (corresponding to 1 ms at 48 kHz sample frequency), and with correspondingly 24 MDCT coefficients per packet which are transmitted over a channel with 5% loss. However, a more stable training was obtained with 96 MDCT coefficients per packet, but resulting in a 4 ms delay compared to 1 ms with 24 MDCT coefficients per packet.

For further information regarding such LSTM neural network, reference is made to: http://www.deeplearning-book.org/ and "LSTM: A search space odyssey", IEEE Transactions on Neural Networks and Learning Systems, 28(10):2222-2232, October 2017.

Figure 5:
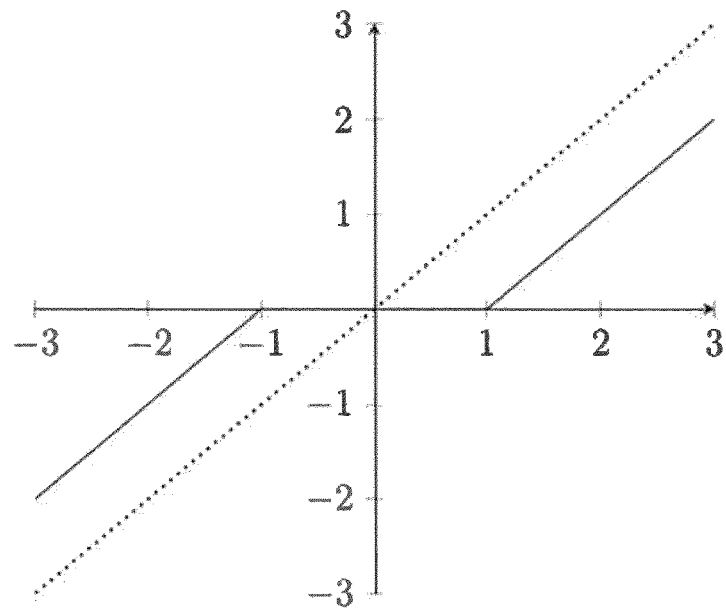
FIG. 5 illustrates one possible implementation of a soft-threshold function to be used for post-processing of prediction output of the LSTM neural network.

FIG. 5 illustrates one possible implementation of a post-processing function to be used for post-processing of prediction output of the LSTM neural network in order to modify the estimated concealment coefficients output by the LSTM neural network. FIG. 5 illustrates an example of a threshold function, namely a soft-threshold function with a threshold value of 1, merely for illustration of the principle, where input amplitude is the horizontal axis, and output amplitude is the vertical axis. The function t_soft as a function of input x, where T is the threshold, is generally:

t_soft=[x−T for x≥T, x+T for x≤−T, and 0 otherwise]

Other post-processing functions can be used, e.g. a hard-threshold function, but listening tests have confirmed a good audio quality with the soft-threshold functions, especially it has been shown to suppress audible high frequency artefacts.

Figure 6:
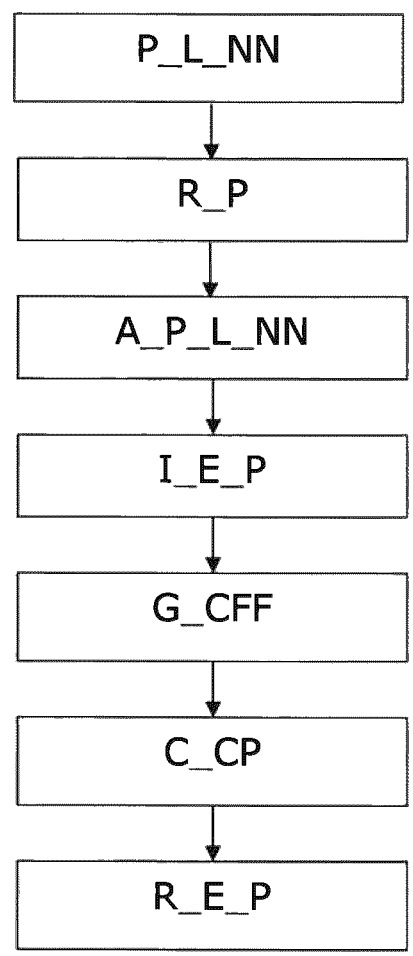
FIG. 6 illustrates steps of a method embodiment.

FIG. 6 illustrates steps of a method embodiment, i.e. a method for concealing errors in packets of data representing an audio signal. First step is providing P_L_NN a Long Short-Term Memory (LSTM) neural network with a plurality of nodes, and pre-training the LSTM neural network with audio data, preferably matching the type of audio which the network is expected to be used for. The LSTM neural network is preferably implemented on a processor system capable of running in real time, as known by the skilled person. Next, receiving R_P a sequence of packets each comprising a set of modified discrete cosine transform (MDCT) coefficients associated with a frame comprising time-domain samples of the audio signal. Next, applying A_P_L_NN the sequence of packets to the LSTM neural network. Further, identifying I_E_P in the received sequence of packets a packet to be an erroneous packet, and identification this can be obtained as known by the skilled person. Next step is generating G_CFF estimated MDCT coefficients to replace the set of MDCT coefficients of the erroneous packet in response to an output from the LSTM neural network, e.g. further applying a post-processing, prior to generating G_CP a concealment packet based on the estimated MDCT coefficients. Finally, replacing R_E_P the erroneous packet with the concealment packet, thus having completed the concealment of the lost or damaged audio content. The method may comprise the step of inverse MDCT transforming the resulting sequence of MDCT packets to arrive at an audio signal.

To sum up, the invention provides a method for real-time concealing errors in audio data packets. A Long Short-Term Memory (LSTM) neural network with a plurality of nodes is provided and pre-trained with audio data, e.g. audio representing specific voice(s) or musical instruments(s) or music genres(s). A sequence of packets is received, each packet comprising a set of modified discrete cosine transform (MDCT) coefficients associated with a frame comprising time-domain samples of the audio signal. These MDCT coefficient data are applied to the LSTM neural network, and in case it is identified that a received packet is an erroneous packet, an output from the LSTM neural network is used to generate estimated MDCT coefficients to provide a concealment packet to replace the erroneous packet. Preferably, the MDCT coefficients are normalized prior to applying to the LSTM neural network. This method can be performed in real-time even on a small wireless portable device receiving an audio stream via e.g. an RF transmission channel with loss. A low latency can be obtained, such as down to 1-3 ms, and still with a high audio quality. An even higher concealment quality can be obtained, if the LSTM neural network is trained for a specific audio content, e.g. a specific voice or musical instrument, e.g. obtained by online training of the LSTM neural network to allow adaptation to the specific audio content streamed.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for concealing errors, the method comprising:
 training a plurality of different Long Short-Term Memory (LSTM) neural network configurations or LSTM neural network data sets using respective different specific audio inputs,
 providing (P_L_NN) a LSTM neural network with a plurality of nodes, wherein the LSTM neural network has been pre-trained with audio data,
 receiving (R_P) a sequence of packets each comprising a set of modified discrete cosine transform (MDCT) coefficients associated with a frame comprising time-domain samples of an audio signal,
 classifying audio in response to the sequence of packets, and selecting one of the different LSTM neural network configurations or LSTM neural network data sets to be used for estimated MDCT coefficient generation accordingly,
 applying (A_P_L_NN) the sequence of packets to the LSTM neural network,
 identifying (I_E_P) in the sequence of packets a packet to be an erroneous packet, generating (G_CFF) estimated MDCT coefficients to replace the set of MDCT coefficients of the erroneous packet in response to an output from the LSTM neural network, generating (G_CP) a concealment packet based on the estimated MDCT coefficients, and replacing (R_E_P) the erroneous packet with the concealment packet.

2. The method according to claim 1, comprising performing a normalizing procedure on the MDCT coefficients of each packet to arrive at a normalized set of MDCT coefficient for each packet, and applying the normalized set of MDCT coefficients to the LSTM neural network.

3. The method according to claim 1, wherein the LSTM neural network is pre-trained with audio data in a form of normalized sets of MDCT coefficients.

4. The method according to claim 1, comprising applying a post-processing of the estimated MDCT coefficients to modify the estimated MDCT coefficients prior to generating the concealment packet.

5. The method according to claim 1, wherein the sequence of packets are overlapping packets each representing audio samples, the sequence of packets optionally overlapping by 20-70%.

6. The method according to claim 1, wherein the LSTM neural network comprises a plurality of LSTM layers, wherein each LSTM layer comprises a plurality of LSTM nodes in parallel.

7. The method according to claim 1, wherein the LSTM neural network has one single LSTM layer of nodes, and optionally wherein outputs from nodes of the single LSTM layer are combined to provide the output of the LSTM neural network with a desired number of elements.

8. The method according to claim 1, comprising (a) training the LSTM neural network by a predetermined loss function using an audio input.

9. The method according to claim 1, wherein said classifying of audio comprises applying an acoustic scene classification algorithm on the sequence of packets to classify received audio with respect to input type-loading of pre-trained set of data for LSTM neural network.

10. The method according to claim 1, wherein transformation of audio samples into MDCT packets is performed prior to transmitting packets over a wireless transmission channel.

11. The method according to claim 1, wherein transformation of audio samples into MDCT packets is performed after receiving packets via a wireless transmission channel.

12. The method of claim 1, wherein the method is performed for one-way or two-way audio streaming.

13. The method of claim 1, further comprising:
training the LSTM neural network using a specific audio input selected from: a specific voice, a specific music instrument, or a specific music genre, or a specific person playing a specific instrument.

14. A computer program product comprising a non-transitory computer-readable medium and with instructions that, when executed on a processor system, cause performance of operations comprising:
training a plurality of different Long Short-Term Memory (LSTM) neural network configurations or LSTM neural network data sets using respective different specific audio inputs,
providing (P_L_NN) a LSTM neural network with a plurality of nodes, wherein the LSTM neural network has been pre-trained with audio data,
receiving (R_P) a sequence of packets each comprising a set of modified discrete cosine transform (MDCT) coefficients associated with a frame comprising time-domain samples of an audio signal,
classifying audio in response to the sequence of packets, and selecting one of the different LSTM neural network configurations or LSTM neural network data sets to be used for estimated MDCT coefficient generation accordingly,
applying (A_P_L_NN) the sequence of packets to the LSTM neural network,
identifying (I_E_P) in the sequence of packets a packet to be an erroneous packet,
generating (G_CFF) estimated MDCT coefficients to replace the set of MDCT coefficients of the erroneous packet in response to an output from the LSTM neural network,
generating (G_CP) a concealment packet based on the estimated MDCT coefficients, and
replacing (R_E_P) the erroneous packet with the concealment packet.

15. The non-transitory computer-readable medium of claim 14, with additional instructions that, when executed on the processor system, cause performance of:
training the LSTM neural network using a specific audio input selected from: a specific voice, a specific music instrument, or a specific music genre, or a specific person playing a specific instrument.

16. One or more devices, comprising:
a wireless receiver configured to receive a wireless signal representing a sequence of packets, and
a packet loss concealment system arranged to perform, on a processor system, to arrive at a modified sequence of packets comprising a concealment packet, operations comprising:
training a plurality of different Long Short-Term Memory (LSTM) neural network configurations or LSTM neural network data sets using respective different specific audio inputs,
providing (P_L_NN) a LSTM neural network with a plurality of nodes, wherein the LSTM neural network has been pre-trained with audio data,
receiving (R_P) the sequence of packets each comprising a set of modified discrete cosine transform (MDCT) coefficients associated with a frame comprising time-domain samples of an audio signal,
classifying audio in response to the sequence of packets, and selecting one of the different LSTM neural network configurations or LSTM neural network data sets to be used for estimated MDCT coefficient generation accordingly,
applying (A_P_L_NN) the sequence of packets to the LSTM neural network,
identifying (I_E_P) in the sequence of packets a packet to be an erroneous packet,
generating (G_CFF) estimated MDCT coefficients to replace the set of MDCT coefficients of the erroneous packet in response to an output from the LSTM neural network,
generating (G_CP) the concealment packet based on the estimated MDCT coefficients, and
replacing (R_E_P) the erroneous packet with the concealment packet.

17. The one or more devices according to claim 16, comprising an audio decoder arranged to receive the modified sequence of packets and to apply an MDCT based audio decoding algorithm so as to decode the modified sequence of packets into a sequence of decoded audio frames.

18. The one or more devices according to claim 16, the one or more devices being one of: a live performance base station, a wireless microphone, a wireless headset, a wireless intercom device, a teleconference system, a wireless audio monitor, and a virtual reality device.

19. The one or more devices according to claim 16, the one or more devices being arranged to generate an output audio signal in response to the received sequence of packets.

20. The one or more devices according to claim 16, wherein the sequence of packets represents samples of a time signal at a sample frequency of at least 8 kHz.

21. The one or more devices according to claim 16, further comprising an audio device comprising a wireless transmitter, wherein the audio device is arranged to generate the sequence of packets and to transmit the wireless signal by means of the wireless transmitter.

22. The one or more devices according to claim 16, wherein the packet loss concealment system is further arranged to perform:
    training the LSTM neural network using a specific audio input selected from: a specific voice, a specific music instrument, or a specific music genre, or a specific person playing a specific instrument.

\* \* \* \* \*